(12) United States Patent
Kodera et al.

(10) Patent No.: US 7,533,825 B2
(45) Date of Patent: May 19, 2009

(54) ELECTRONIC APPARATUS WHICH REQUIRES LESS SPACE FOR LOADING AND UNLOADING AN OBJECT

(75) Inventors: Masafumi Kodera, Tokyo (JP); Joe Motojima, Tokyo (JP); Akira Natori, Tokyo (JP); Keiichiro Suzuki, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 645 days.

(21) Appl. No.: 11/184,245

(22) Filed: Jul. 19, 2005

(65) Prior Publication Data

US 2006/0016888 A1 Jan. 26, 2006

(30) Foreign Application Priority Data

Jul. 20, 2004 (JP) .............................. 2004-211496

(51) Int. Cl.
*G06K 7/00* (2006.01)
(52) U.S. Cl. ..................................................... 235/486
(58) Field of Classification Search .................. 235/486
See application file for complete search history.

(56) References Cited

U.S. PATENT DOCUMENTS 5,784,251 A * 7/1998 Miller et al. ................ 361/683
6,027,025 A * 2/2000 Postrel et al. ............... 235/486
6,716,069 B2 4/2004 Nakamura et al.
6,888,724 B2 * 5/2005 Shaie ......................... 361/719
7,025,275 B2 * 4/2006 Huang et al. ................ 235/486

FOREIGN PATENT DOCUMENTS

| EP | 0 379 921 A2 | 8/1990 |
|---|---|---|
| JP | 2002-083643 A | 3/2002 |
| JP | 2002-203622 A | 7/2002 |
| JP | 2002-305046 A | 10/2002 |
| JP | 2003-007390 A | 1/2003 |
| JP | 2004-066935 A | 3/2004 |
| WO | WO 03/042901 A1 | 5/2003 |

OTHER PUBLICATIONS

English translation of substantive portions of a Japanese Office Action dated Aug. 15, 2007 for Japanese Patent Application No. 2004-211496, 3 pages.

* cited by examiner

*Primary Examiner*—Daniel A Hess
(74) *Attorney, Agent, or Firm*—Frishauf, Holtz, Goodman & Chick, P.C.

(57) ABSTRACT

In an electronic apparatus adapted to load and unload an object, a contact is held by a base having a principal surface. The contact has a contacting portion which is formed on the principal surface and elastically displaceable in a direction intersecting the principal surface. A holder is coupled to the base to be rotatable around an axis extending in a first direction perpendicular to the principal surface. The holder has a receiving portion adapted to hold the object and is adapted to bring the object into contact with the contacting portion.

13 Claims, 7 Drawing Sheets

ELECTRONIC APPARATUS WHICH REQUIRES LESS SPACE FOR LOADING AND UNLOADING AN OBJECT

This application claims priority to prior Japanese patent application JP 2004-211496, the disclosure of which is incorporated herein by reference.

BACKGROUND OF THE INVENTION

This invention relates to an electronic apparatus adapted to receive an object, such as a memory card, to be used therewith.

For example, Japanese Unexamined Patent Application Publication (JP-A) No. 2002-305046 discloses a card loading device for removably loading a card in an electronic apparatus. The card loading device comprises a base member having a contact, and a card holder rotatably coupled to the base member. The card holder holds the memory card and, following the rotation with respect to the base member, moves the memory card in its thickness direction as a first direction to connect and disconnect the memory card to and from the contact. The memory card is inserted into and removed from the card holder by sliding the memory card in a second direction perpendicular to the first direction.

However, the above-mentioned card loading device loads and unloads the memory card by moving the memory card in the first and the second directions perpendicular to each other. Therefore, large space is required for loading and unloading operations of the memory card. This results in a low degree freedom of the electronic apparatus.

SUMMARY OF THE INVENTION

It is therefore an object of this invention to provide an electronic apparatus which requires less space for loading and unloading an object.

It is another object of this invention to provide an electronic apparatus with a high design freedom.

Other objects of the present invention will become clear as the description proceeds.

According to an aspect of the present invention, there is provided an electronic apparatus adapted to load and unload an object, the electronic apparatus comprising a base having a principal surface, a contact held by the base and having a contacting portion which is formed on the principal surface and elastically displaceable in a direction intersecting the principal surface, and a holder coupled to the base to be rotatable around an axis extending in a first direction perpendicular to the principal surface, the holder having a receiving portion adapted to hold the object and being adapted to bring the object into contact with the contacting portion.

DESCRIPTION OF THE PREFERRED EMBODIMENT

Referring to FIGS. 1 to 6, description will be made of an electronic apparatus according to an embodiment of this invention.

Figure 1:
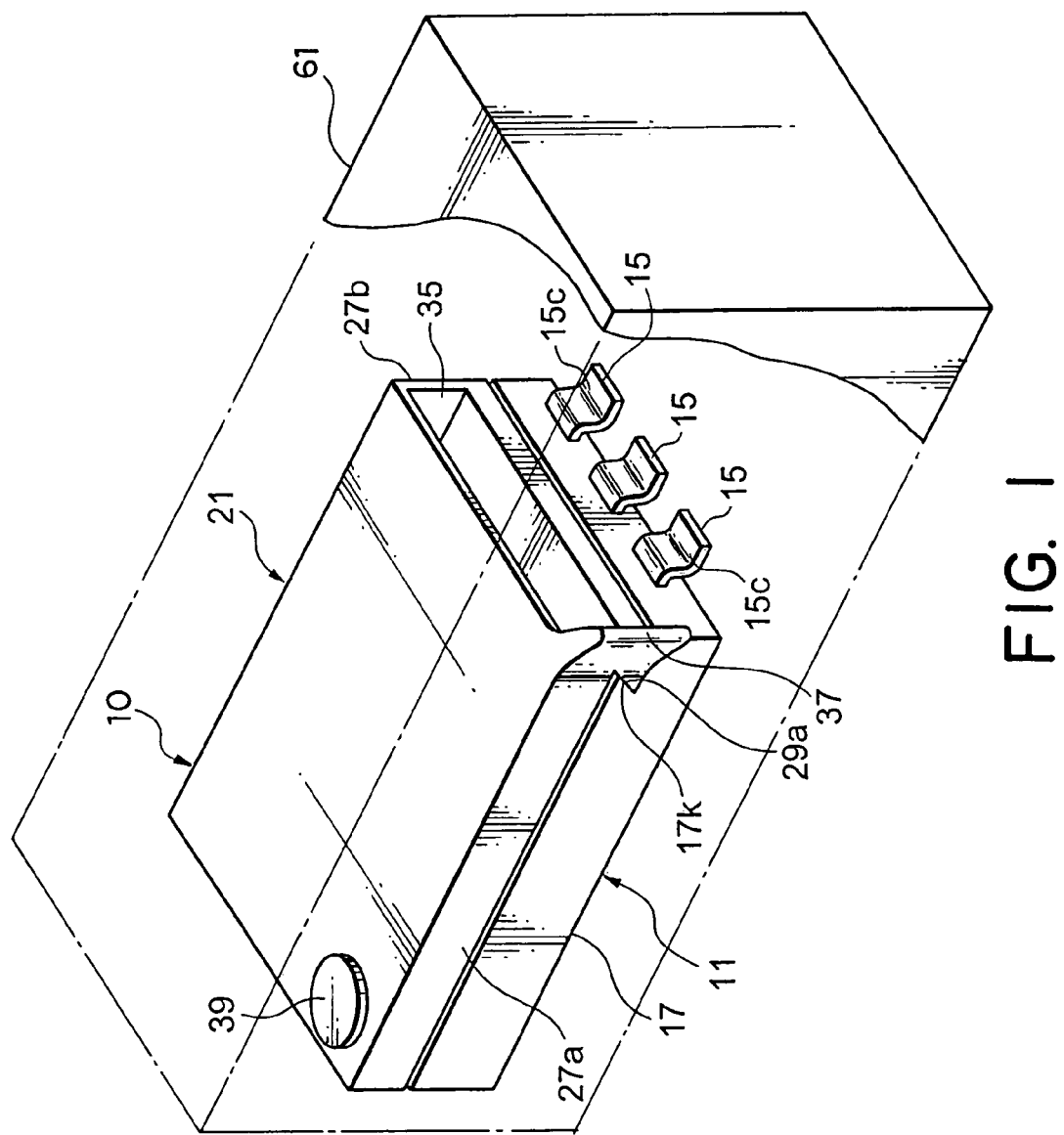
FIG. 1 is a perspective view of an electronic apparatus according to an embodiment of this invention.

The electronic apparatus illustrated in FIG. 1 is adapted to receive an object, such as a memory card, to be used therewith. The electronic apparatus comprises an apparatus body or a housing 61 defining a component area where various components of the apparatus are arranged, and a card loading device, i.e., a connector 10 disposed at a part of the component area of the housing 61. For convenience of illustration, most part of the housing 61 is cut away.

Figure 2:
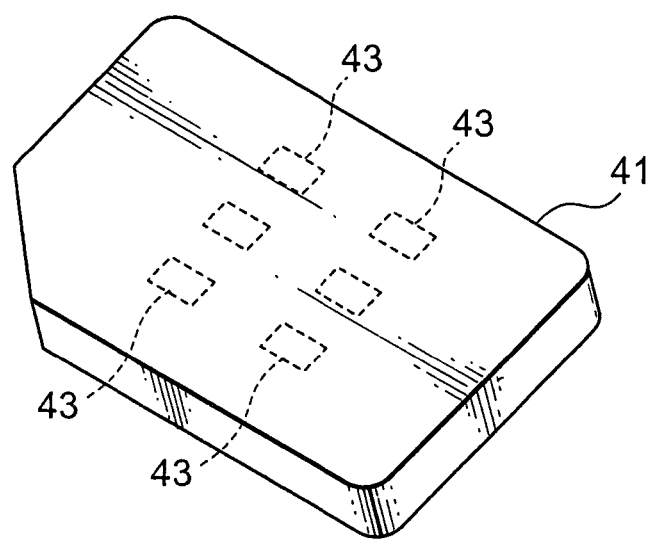
FIG. 2 is a perspective view of a card which can be used with the electronic apparatus illustrated in FIG. 1.

The connector 10 is adapted to connect a card 41 illustrated in FIG. 2. The connector 10 comprises a fixed portion 11 fixed to the housing 61 and a holder 21 coupled to the fixed portion 11 via a rotation shaft 39 to be rotatable around the rotation shaft 39 with respect to the fixed portion 11. The card 41 is, for example, a memory card and has a plurality of connection pads or terminals 43 disposed on its surface in a predetermined pattern.

Figure 3:
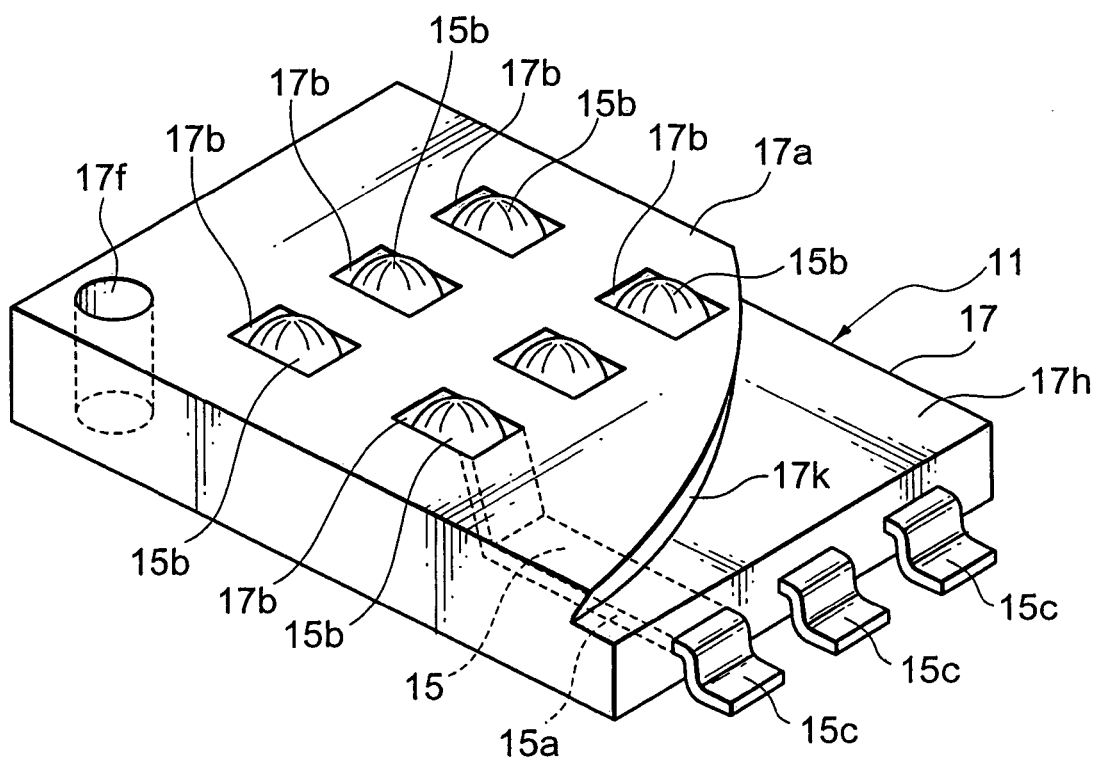
FIG. 3 is a perspective view of a fixed portion of a connector in the electronic apparatus illustrated in FIG. 1.

Referring to FIG. 3, the fixed portion 11 has a plurality of, i.e., six conductive contacts 15 and an insulator or an insulating base 17 having a generally rectangular plate-like shape and holding the contacts 15. Each of the contacts 15 has a holding portion 15a held by the base 17, a contacting portion 15b formed at one end of the holding portion 15a and exposed on a flat principal surface 17a of the base 17, and a terminal portion 15c formed at the other end of the holding portion 15a and extending outward from the base 17.

The principal surface 17a of the base 17 has a plurality of, i.e., six holes 17b formed in conformity with the predetermined pattern of the terminals 43. Each of the holes 17b allows the contacting portion 15b of the contact 15 to be elastically displaced in a first direction perpendicular to the principal surface 17a. Specifically, the contacting portion 15b normally protrudes from the hole 17b above the principal surface 17a and, when it is depressed downward, sinks or retreats into the hole 17b.

Figure 5:
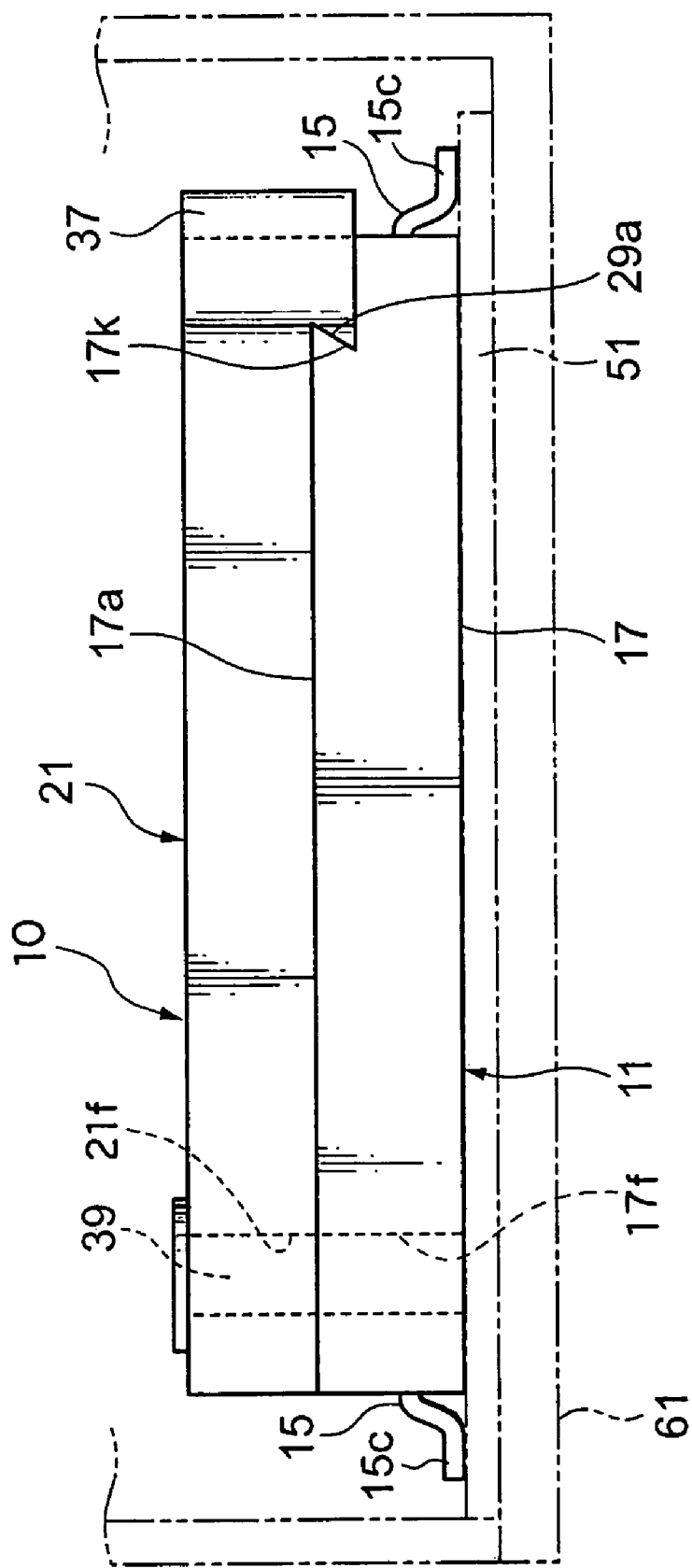
FIG. 5 is a side view of the connector in the electronic apparatus in FIG. 1.
Figure 6:
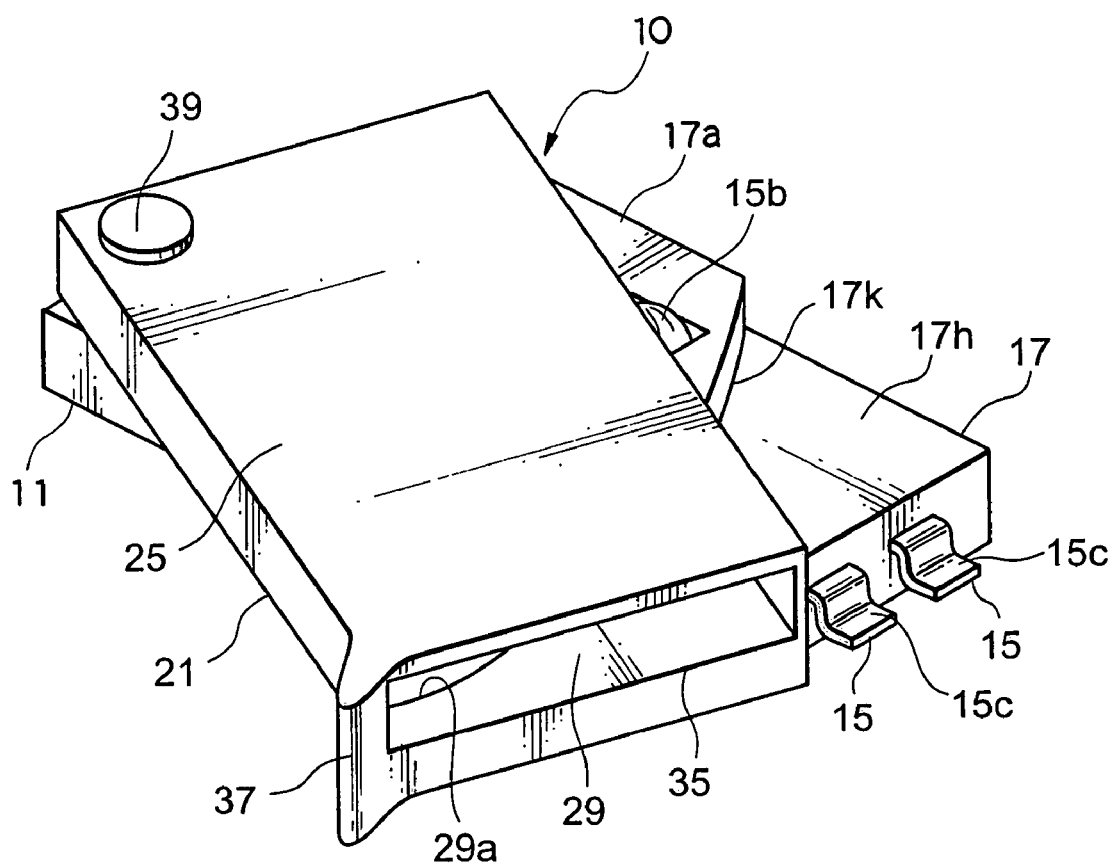
FIG. 6 is a perspective view of the connector in an operated state.

The base 17 has a first shaft hole 17f formed near one of four corners thereof and extending in the first direction from the principal surface 17a towards an opposite surface. The base 17 has a flat auxiliary surface 17h formed around another corner diametrically opposite to the first shaft hole 17 and lowered in height from the principal surface 17a. At a boundary between the principal surface 17a and the auxiliary surface 17h, a guiding surface 17k is formed and extends along an arc having a first radius from the first shaft hole 17f as a center. As best shown in FIG. 5, the guiding surface 17k is inclined obliquely from an edge of the principal surface 17a of the base 17 towards a rear side, i.e., towards the side of the first shaft hole 17f of the base 17. Thus, the guiding surface 17k is inclined at an acute or sharp angle with respect to the principal surface 17a. The principal surface 17a and the auxiliary surface 17h extend in parallel to each other.

Figure 4A:
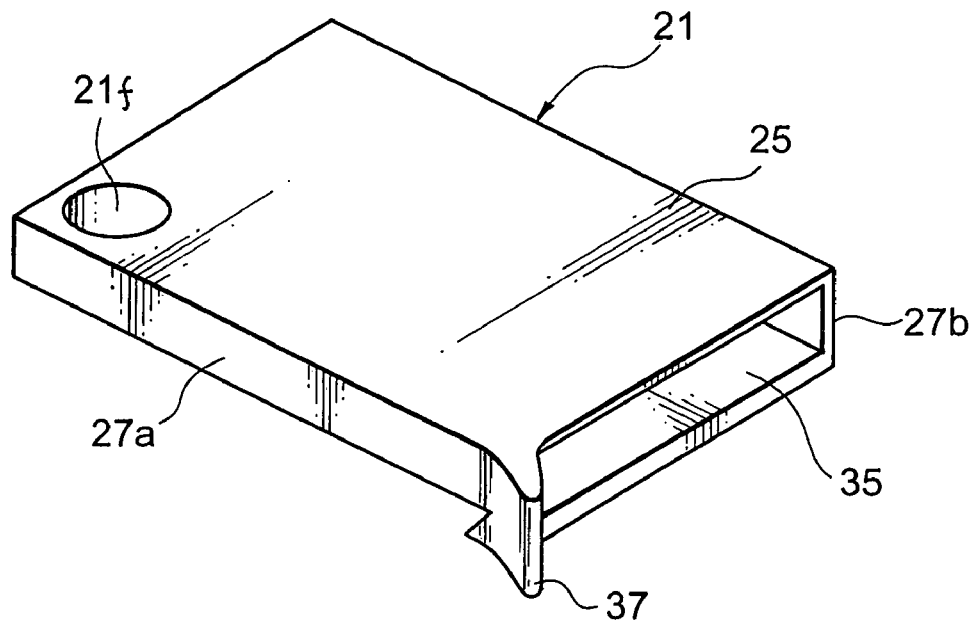
FIG. 4A is a top perspective view of a holder in the connector illustrated in FIG. 1.
Figure 4B:
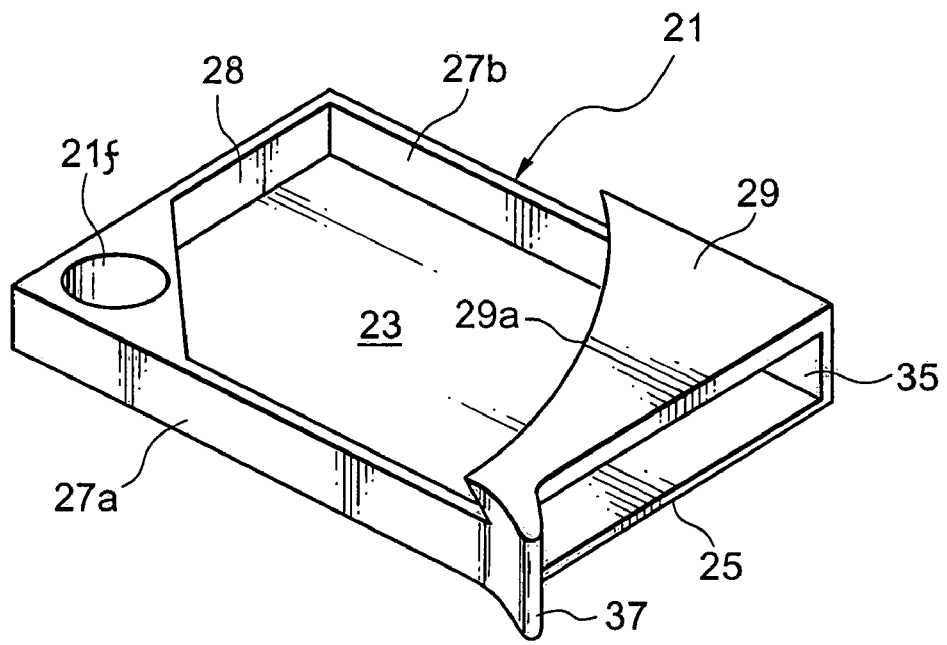
FIG. 4B is a bottom perspective view of the holder illustrated in FIG. 4A.

Referring to FIGS. 4A and 4B, the holder 21 has a generally rectangular plate-like shape and has a size and a shape sufficient to entirely cover the principal surface 17a and the auxiliary surface 17h of the base 17. Preferably, the holder 21 is made of an insulating material. The holder 21 has a second shaft hole 21f. The second shaft hole 21f is formed near one of four corners thereof and penetrates the holder 21 in its thickness direction, i.e., the first direction.

The holder 21 is provided with a first receiving portion, i.e., a card receiving portion 23 adapted to receive and hold the card 41 illustrated in FIG. 2. The card receiving portion 23 has a top plate portion 25 faced to the principal surface 17a and the auxiliary surface 17h of the base 17, a pair of side plate portions 27a and 27b perpendicularly bent from a pair of longitudinal sides of the top plate portion 25, respectively, and faced to each other, a rear plate portion 28 adjacent to the second shaft hole 21f and connecting the top plate portion 25 and the side plate portions 27a and 27b, and a front plate portion 29 formed on an opposite side from the second shaft hole 21f, faced to the top plate portion 25 with a space left therefrom, and connected between the side plate portions 27a and 27b.

The front plate portion 29 has a guided surface 29a extending along an arc having a second radius from the second shaft hole 21f as a center. The second radius is equal to or slightly greater than the first radius mentioned above. As best shown in FIG. 5, the guided surface 29a is inclined in the manner similar to the guiding surface 17k.

The holder 21 is provided with an insertion slot 35 formed on the opposite side from the second shaft hole 21f and surrounded by the top plate portion 25, the side plate portions 27a and 27b, and the front plate portion 29 so as to allow insertion and removal of the card 41 into and from the card receiving portion 23. Adjacent to the insertion slot 35, an operating portion 37 obliquely protrudes from the front plate portion 29 and the side plate portion 27a.

As illustrated in FIGS. 1 and 5, the holder 21 is placed on the principal surface 17a and the auxiliary surface 17h of the base 17. The rotation shaft 39 is inserted into the first and the second shaft holes 17f and 21f. As a consequence, the holder 21 is engaged with the fixed portion 11 to be rotatable with respect to the fixed portion 11. Thus, the holder 21 is rotatable with respect to an axis extending in the first direction. Further, in a second direction perpendicular to the first direction, i.e., in a radial direction, the guided surface 29a is faced to the guiding surface 17k in close proximity thereto. The guided surface 29a and the guiding surface 17k are inclined in the same direction and, therefore, are faced to each other in the first direction also. Therefore, a combination of the guided surface 29a and the guiding surface 17k serves as an engaging mechanism engaging the base 17 and the holder 21 in the first direction. In FIG. 5, each terminals 15c extending outward from the base 17 is connected by soldering to an electric circuit of a printed wiring board 51 depicted by two-dot-and-dash lines.

In the electronic apparatus described above, the holder 21 is movable between a first position (FIG. 1) at which the holder 21 is substantially completely overlapped with the base 17 and a second position (FIG. 6) at which the holder 21 is slightly shifted from the base 17. When the holder 21 is located at the second position, the card 41 in FIG. 2 is inserted into the holder 21 through the insertion slot 35. At this time, the card 41 is not contacted with the contacting portions 15b of the contacts 15. Thus, the card 41 is smoothly inserted without interference.

After the card 41 is inserted into the holder 21, the holder 21 is rotated towards the first position. Then, the card 41 slides and presses the contacting portions 15b of the contacts 15. When the holder 21 reaches the first position, the terminals 43 of the card 41 are brought into contact with the contacting portions 15b of the contacts 15 in one-to-one correspondence. Thus, the card 41 is connected to the connector 10 to obtain a card connected state. In the card connected state, the contacting portions 15b are elastically displaced and substantially completely sink into the holes 17b of the base 17, respectively.

In the card connected state, reactive force of the contacting portions 15b of the contacts 15 acts upon the holder 21 so that the holder 21 is separated from the base 17 in the first direction. Actually, however, the holder 21 is prevented from being lifted up and separated from the base 17 by the above-mentioned engaging mechanism.

It is noted here that the card 41 can be inserted into the holder 21 through the insertion slot 35 when the holder 21 is placed at the first position.

Figure 7:
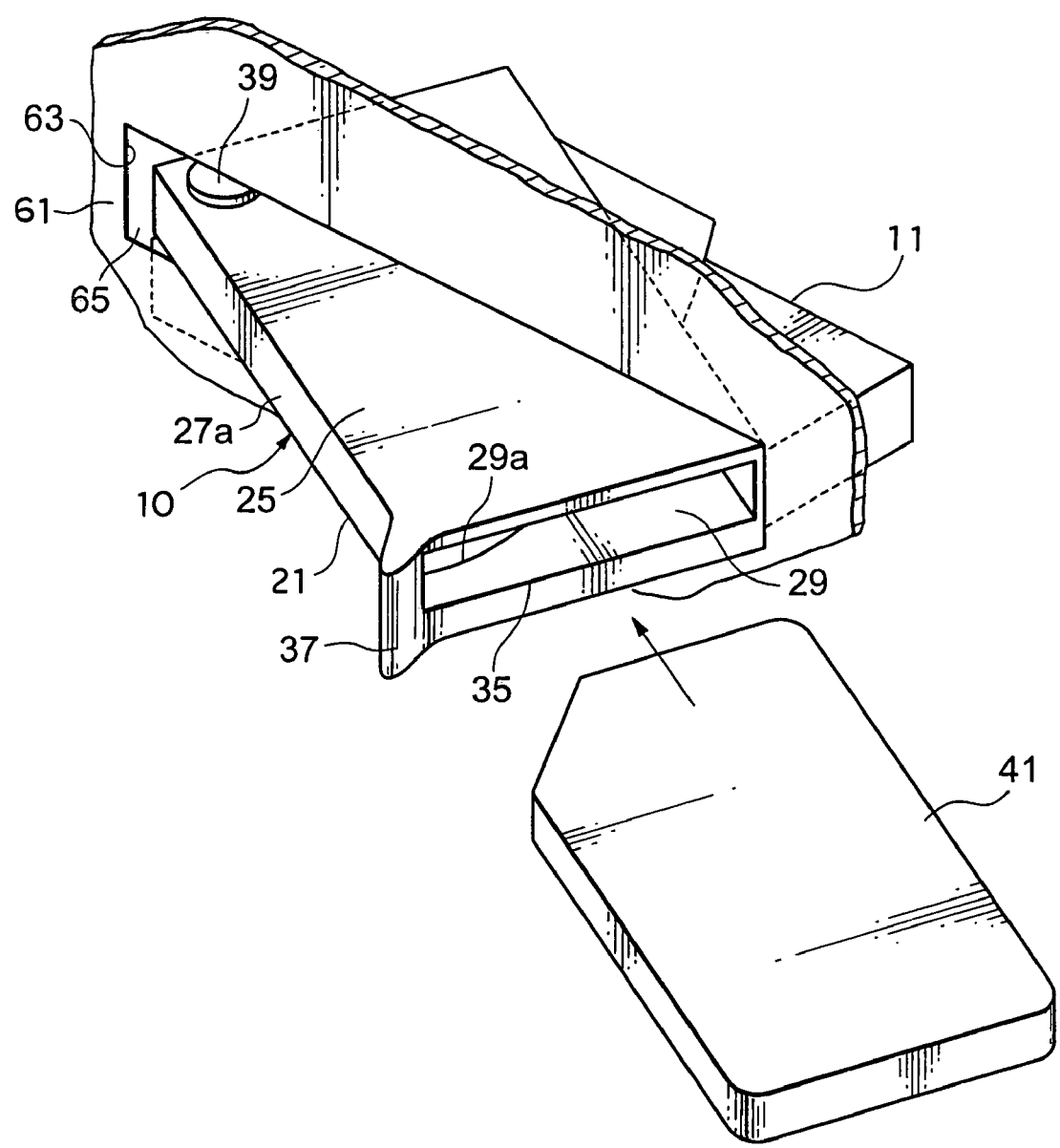
FIG. 7 is a perspective view of a modification of the electronic apparatus in FIG. 1 before a card is connected thereto.
Figure 8:
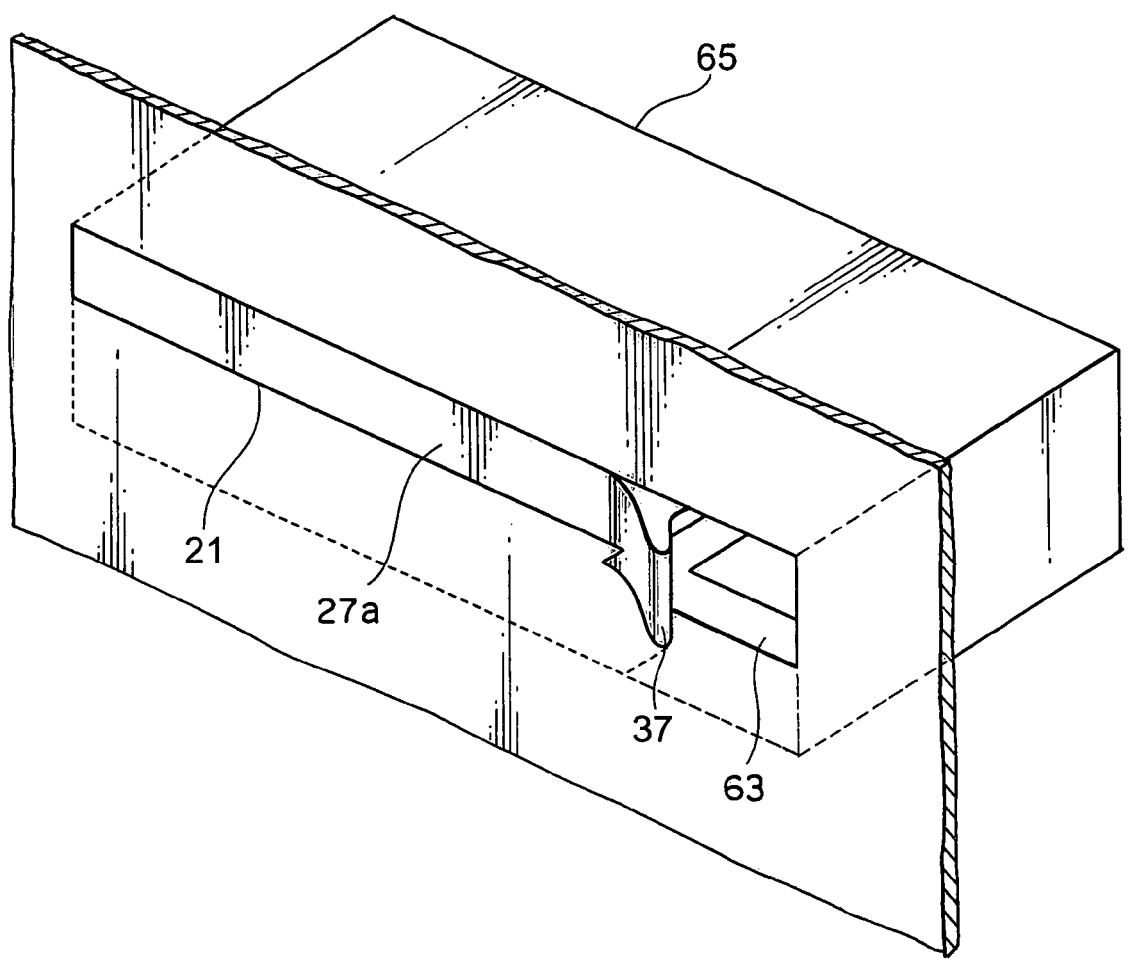
FIG. 8 is a perspective view of the modification of the electronic apparatus in FIG. 7 after the card is connected thereto.

Referring to FIGS. 7 and 8, description will be made of a modification of the above-mentioned electronic apparatus. Similar parts are designated by like reference numerals and description thereof will be omitted. For convenience of illustration, most part of the housing 61 is omitted.

The housing 61 defines a connector receiving portion 65 for receiving and fixing the connector 10. The housing 61 is provided with an opening 63 formed on its side surface and adjacent to the connector receiving portion 65. The rotation shaft 39 as a center of rotation of the holder 21 is arranged adjacent to the opening 63. The opening 63 is designed taking into account the shape and the rotation path or track of the holder 21 so that the holder 21 can be pulled out laterally. Therefore, the holder 21 is normally located at a first position (FIG. 8) at which the holder 21 is received in the connector receiving portion 65. If necessary, the holder 21 can be moved to a second position (FIG. 7) at which the holder 21 is pulled out from the housing 61 through the opening 63. Preferably, the operating portion 37 of the holder 21 is exposed outside the housing 61 even when the holder 21 is received in the connector receiving portion 65.

In order to load the card 41 into the connector 10, the holder 21 is at first pulled out from the housing 61 by operating the operating portion 37 as illustrated in FIG. 7. In this state, the card 41 is inserted into the insertion slot 35 of the holder 21. Next, the holder 21 is forced into the housing 61. When the holder 21 is completely pushed inside the housing 61, the card 41 is connected to the connector 10 in the manner similar to the electronic apparatus described in connection with FIGS. 1 to 6.

In order to unload the card 41 from the connector 10, the holder 21 is pulled out from the housing 61 by operating the operating portion 37. Then, the card 41 is pulled out from the holder 21.

When the card 41 is loaded and unloaded, the holder 21 is rotated around the rotation shaft 39. However, since a plane of rotation of the holder 21 is parallel to a plane of movement of the card 41 upon insertion, a space required to load and unload the card 41 is relatively small.

Additionally, a spring for urging the holder 21 towards the second position and a locking mechanism for locking the holder 21 at the first position may be provided. If necessary, the locking mechanism is unlocked so that the holder 21 is automatically moved to the second position under the urging force of the spring.

This invention is applicable to a wide variety of electronic apparatus including a mobile telephone, a personal computer, and peripheral equipment connected to the personal computer.

While the present invention has thus far been described in connection with the preferred embodiment thereof, it will readily be possible for those skilled in the art to put this invention into practice in various other manners. For example, although the shown connector uses plural contacts, it may be designed that the connector uses a single contact alone.

What is claimed is:

1. An electronic apparatus adapted to load and unload an object, the electronic apparatus comprising:
    a base having a principal surface;
    a contact held by the base and having a contacting portion that is provided at the principal surface and is elastically displaceable in a direction intersecting the principal surface;
    a holder coupled to the base to be rotatable around an axis extending in a first direction that is perpendicular to the principal surface, wherein the holder has a receiving portion adapted to hold the object, and the holder is adapted to bring the object into contact with the contacting portion; and
    a housing which defines a component area where components of the apparatus are arranged and which has an opening, wherein the base and the holder are arranged in the component area, and the holder is adapted to be pulled out from the housing through the opening with rotation relative to the base.

2. The electronic apparatus according to claim 1, wherein the holder includes an operating portion that is exposed outside the housing.

3. The electronic apparatus according to claim 1, wherein the axis is disposed adjacent to the opening.

4. The electronic apparatus according to claim 1, wherein the object is a card having a terminal to be brought into contact with the contacting portion, and the receiving portion has a shape that is adapted to receive the card.

5. The electronic apparatus according to claim 1, wherein the base comprises an insulator having the principal surface, the insulator has a hole formed in the principal surface, and the contacting portion is disposed in the hole.

6. An electronic apparatus adapted to load and unload an object, the electronic apparatus comprising:
    a base having a principal surface;
    a contact held by the base and having a contacting portion that is provided at the principal surface and elastically displaceable in a direction intersecting the principal surface;
    a holder coupled to the base to be rotatable around an axis extending in a first direction that is perpendicular to the principal surface, wherein the holder has a receiving portion adapted to hold the object, and the holder is adapted to bring the object into contact with the contacting portion; and
    an engaging mechanism which engages the base and the holder with each other in the first direction.

7. The electronic apparatus according to claim 6, wherein the engaging mechanism comprises:
    a guiding surface which is formed on the base and is adjacent to the principal surface; and
    a guided surface which is formed on the holder and is adjacent to the guiding surface in a second direction that is perpendicular to the first direction, wherein the guiding surface and the guided surface face each other in the first direction.

8. The electronic apparatus according to claim 7, wherein at least one of the guiding surface and the guided surface is inclined at an acute angle with respect to the principal surface.

9. The electronic apparatus according to claim 7, wherein at least one of the guiding surface and the guided surface extends along an arc around the axis.

10. The electronic apparatus according to claim 7, wherein the base has an auxiliary surface that is perpendicular to the first direction and is disposed opposite from the principal surface with respect to the guiding surface, and the holder includes a plate portion that slides on the auxiliary surface during rotation.

11. The electronic apparatus according to claim 10, wherein the base comprises an insulator having the principal surface, the guiding surface, and the auxiliary surface, the insulator has a hole formed in the principal surface, and the contacting portion is disposed in the hole.

12. The electronic apparatus according to claim 6, wherein the object is a card having a terminal to be brought into contact with the contacting portion, and the receiving portion has a shape that is adapted to receive the card.

13. The electronic apparatus according to claim 6, wherein the base comprises an insulator having the principal surface, the insulator has a hole formed in the principal surface, and the contacting portion is disposed in the hole.

* * * * *